United States Patent
Suda (10) Patent No.: US 7,084,908 B2
(45) Date of Patent: Aug. 1, 2006

(54) IMAGE SIGNAL RECORDING APPARATUS WITH CONTROLLED RECORDING OF MAIN, PRECEDING AND SUCCEEDING MOVING IMAGE SIGNALS

(75) Inventor: Hirofumi Suda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 668 days.

(21) Appl. No.: 10/058,432

(22) Filed: Jan. 28, 2002

(65) Prior Publication Data

US 2002/0101518 A1  Aug. 1, 2002

(30) Foreign Application Priority Data

Feb. 1, 2001  (JP) .............................. 2001/025801

(51) Int. Cl.
*H04N 5/76* (2006.01)

(52) U.S. Cl. ........................ 348/231.2; 386/52; 386/55; 386/95

(58) Field of Classification Search ............. 348/231.4, 348/700, 231.2–231.3, 211.13, 148–149, 348/74, 239; 386/66, 96, 52, 55, 53; 360/5, 360/62, 64; 438/231.2
See application file for complete search history.

(56) References Cited

U.S. PATENT DOCUMENTS

| | | | | |
|---|---|---|---|---|
| 6,035,367 A | * | 3/2000 | Laws | 711/100 |
| 6,052,508 A | * | 4/2000 | Mincy et al. | 386/96 |
| 6,163,338 A | * | 12/2000 | Johnson et al. | 348/148 |
| 6,674,955 B1 | * | 1/2004 | Matsui et al. | 386/52 |

FOREIGN PATENT DOCUMENTS

| | | | |
|---|---|---|---|
| EP | 985899 A1 | * | 3/2000 |
| WO | WO 9626600 A1 | * | 8/1996 |

* cited by examiner

Primary Examiner—Tuan Ho
Assistant Examiner—Gary C. Vieaux
(74) Attorney, Agent, or Firm—Cowan, Liebowitz & Latman, P.C.

(57) ABSTRACT

A recording apparatus, which is designed to generate play list data according to a recording operation of a moving image signal, the play list data being used for controlling a reproducing process of one moving image stream including a moving image signal so as to inhibit reproducing of moving image signals of a first predetermined period from a head of the moving image stream and a second predetermined period immediately before an end of the moving image stream, and reproduce a moving image signal of a period other than the first and second predetermined periods, and record the play list data together with the moving image signal on a recording medium.

11 Claims, 7 Drawing Sheets

```
PLAY LIST 2 {
    REPRODUCE TAKE 1 FROM 301A TO 301B WITH FADE-IN ;
    REPRODUCE TAKE 1 FROM 301B TO 301C ;
    REPRODUCE TAKE 1 FROM 301C TO 301D WITH FADE-OUT ;
}
```

IMAGE SIGNAL RECORDING APPARATUS WITH CONTROLLED RECORDING OF MAIN, PRECEDING AND SUCCEEDING MOVING IMAGE SIGNALS

BACKGROUND OF THE INVENTION

1. Field of the Invention

The present invention relates to an image signal recording apparatus, and more particularly, it relates to control of an operation performed at the time of starting/stopping recording.

2. Description of the Related Art

As an image recording/reproducing apparatus for recording a moving image, and reproducing the recorded image, there has conventionally been available a digital video tape recorder (VTR), which is designed to convert an image signal into a digital signal, and then record it on a magnetic tape. In this digital VTR, since a medium for recording is the magnetic tape, a video image is recorded by a sequential recording system for sequentially recording video image takes (video image information which is continuous in time and obtained from a start of a photographing recording operation to its stop) in a photographing order. Now, this system is described by referring to FIG. 8.

Figure 8:
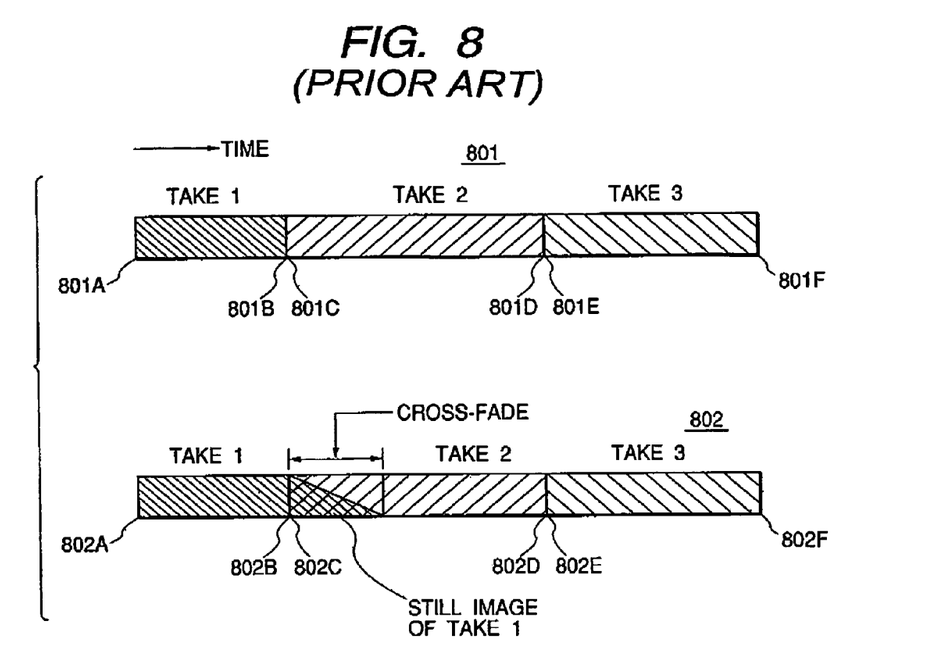
FIG. 8 is a view showing a sequential recording method for a conventional magnetic tape.

FIG. 8 shows the conventional sequential recording method for the magnetic tape.

As indicated by a reference numeral 801 of FIG. 8, upon an operation 801A of a recording start of the digital VTR, recording of a take 1 are started. By an operation 801B of a recording stop, the recording of the take 1 is stopped. Subsequently, by an operation 801C of a recording start, recording of a take 2 after the take 1 is started. Then, by an operation 801D of a recording stop, the recording of the take 2 is stopped. Thereafter, similar recording start designation is made for a take 3, and the take 3 is recorded after the take 2.

In the case of reproducing the video image recorded by the sequential recording method, an order of takes to be reproduced is similar to that of recording, and thus it is difficult to search a desired scene and change the order.

On the other hand, an apparatus has been presented, which is designed to record a video signal or an audio signal on a magnetic disk or a magneto-optical disk, which is a random-access medium, or a solid memory such as a flush memory or an SRAM. In the apparatus for recording a video signal in the random-access memory, the video signal is recorded at random in a space area of the memory. This apparatus is now described by referring to FIG. 9.

Figure 9:
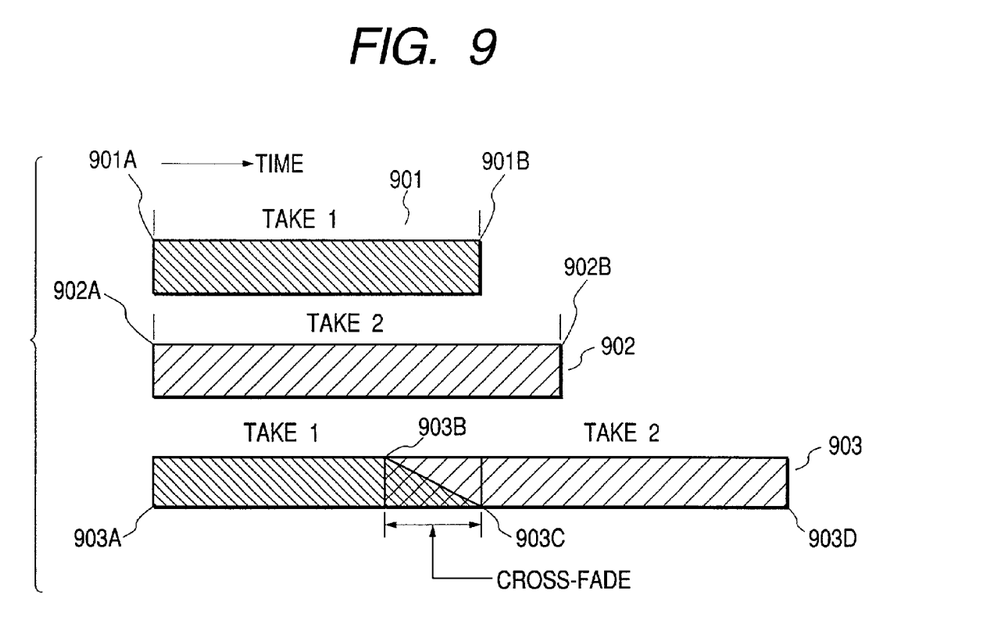
FIG. 9 is a view showing a state of a signal recorded in a random access medium.

FIG. 9 shows states of video signals of takes 1 and 2 recorded on the random-access medium.

As indicated by reference numerals 901 and 902 of FIG. 9, take recording is started by each of operations 901A and 902A of recording starts, and the take recording is stopped by each of operations 901B and 902B of recording stops. The takes 1 and 2 are recorded in positions independent of each other on the medium. By this system, because of a medium characteristic, an order of reading-out is not dependent on an order of recording, enabling reading-out to be made optionally from any recoding area. Thus, it is possible to easily search and reproduce a preferred moving image directly, and change an order of a plurality of scenes.

In such a recording apparatus, by compressing an input digital signal to reduce the quantity of information, a great deal of moving image information or still image information can be recorded with a small storage capacity. There are various methods available for such a compression system of the image recording/reproducing apparatus.

For example, in the case of an orthogonal transformation method, an image is divided into blocks each composed of vertical n pixels and horizontal n pixels. Then, the image is quantized by performing orthogonal transformation such as discrete cosine transformation on each block, and rounding each obtained coefficient to a specified number of bits. Since image information is generally biased in a low-frequency area, the quantity of data can be reduced by reducing the number of bits of high-frequency components. In addition, in the case of a variable length coding method such as Huffman coding, efficient data compression can be performed by allocating shorter codes to a bit sequence having a higher appearance probability.

In the case of compressing a moving image, the quantity of data is greatly reduced by utilizing a characteristic of a strong correlation between image frames of the moving image so as to extract a difference between the frames.

In the moving image recording system, the quantity of data is reduced by combining such various compression techniques to compress the moving image, and then the image is recorded on the tape which is a sequential access medium, or the solid magnetic disk memory or the optical disk memory which is a random access memory.

In the foregoing recording apparatus, a scene changing effect such as cross fade has conventionally been applied to a joining part between the takes.

In the digital VTR using the sequential access medium, a scene changing effect such as cross fade must be applied during recording, and now this process is described by referring to FIG. 8.

As indicated by a reference numeral 802 of FIG. 8, when an effect such as cross face is applied to record an image signal, recording of the take 1 is started by a recording start operation 802A. When the recording of the take 2 is stopped by a recording stop operation 802B, one frame of a last scene of the take 1 is stored as a still image in an internal memory. Then, the still image stored in the memory is repeatedly read out according to a recording start operation 802C of the take 2. Cross fade processing is carried out such that a video image of a head part of the take 2 can appear little by little, and simultaneously the still image of the last scene of the take 1 can disappear little by little. Lastly, only a moving image of the take 2 remains. Then, the recording of the take 2 is stopped by a recording stop operation 802D.

In this case, because of a characteristic of the sequential access medium, data of the takes 1 and 2 cannot be read out simultaneously, or the data of the take 2 cannot be recorded while the data of the take 1 is read out. Consequently, as long as the respective takes are continuously recorded on one tape, cross fade from one moving image to another is impossible, and only cross fade from the still image to the moving image can be realized. Also, since a cross fade processing must be done during recording, a manipulation for executing cross fade processing must be performed during photographing, thereby complicating the manipulation operation. Consequently, a user cannot concentrate on photographing.

On the other hand, in the case of applying a scene changing effect such as cross fade to the data recorded on the random access medium, the foregoing drawbacks in the case of using the sequential access medium are solved. Hereinafter, description is made of the case of applying the scene changing effect such as cross fade to the joining part between the takes 1 and 2 recorded on the random access medium.

In the case of the random access medium, a scene changing effect such as cross fade can be applied not during recording but during reproducing. This process is now described by referring to FIG. 9.

In this case, as indicated by a reference numeral 903 of FIG. 9, the photographed take 1 is reproduced by a reproducing start operation 903A, and continued until an operation 903B. Then, reproducing of the take 2 is started at a point of time when the last part 903B of the take 1 to be subjected to cross fade is reproduced, and cross fade processing is executed from 903B to 903C such that a head part of the take 2 can appear little by little at the same time when a video after 903B of the take 1 disappears little by little. After 903C, only the video image of the take 2 is reproduced.

In the case of using the random access medium enabling the data of the takes 1 and 2 to be simultaneously reproduced, such cross fade processing can be executed during reproducing. In a cross fade part, by changing a mixing ratio of the two video images little by little, cross fade from one moving image to another can be realized.

Generally, the video image of the take is obtained by intentionally starting recording based on the recording start operation by the user, and intentionally stopping the recording based on the recording stop operation by the user. Thus, there is a high possibility that important video images are included throughout the takes.

Therefore, as described above, when a scene changing effect such as cross fade is applied between two moving image data by using the random access medium during reproducing, if an important video image is included in a last part of a first half moving image data (e.g., take 1) or a second half moving image data (e.g., take 2), such the important video image becomes unsharp because of fade-out or fade-in, and thus it cannot be seen clearly.

SUMMARY OF THE INVENTION

An object of the present invention is to solve the foregoing problems.

Another object of the present invention is to enable a video image recorded during a period from a recording start time to a recording stop time to be reproduced without being indistinct, even when a scene changing effect such as cross fade is applied.

In order to achieve the above-described objects, in accordance with an aspect of the present invention, there is provided a recording apparatus comprising: input means for inputting a moving image signal; a memory adapted to store the moving image signal input by the input means; a recording medium interface adapted to record the image signal read out from the memory on a recording medium; and control means for controlling the memory and the recording medium interface so as to record on the recording medium a main moving image signal input by the input means during a period from recording start designation to recording stop designation, together with a preceding moving image signal input by the input means during a first predetermined period immediately before the recording start designation, and a succeeding moving image signal input by the input means during a second predetermined period immediately after the recording stop designation.

DETAILED DESCRIPTION OF THE PREFERRED EMBODIMENTS

Next, description will be made of the preferred embodiments of the present invention with reference to the accompanying drawings.

Figure 1:
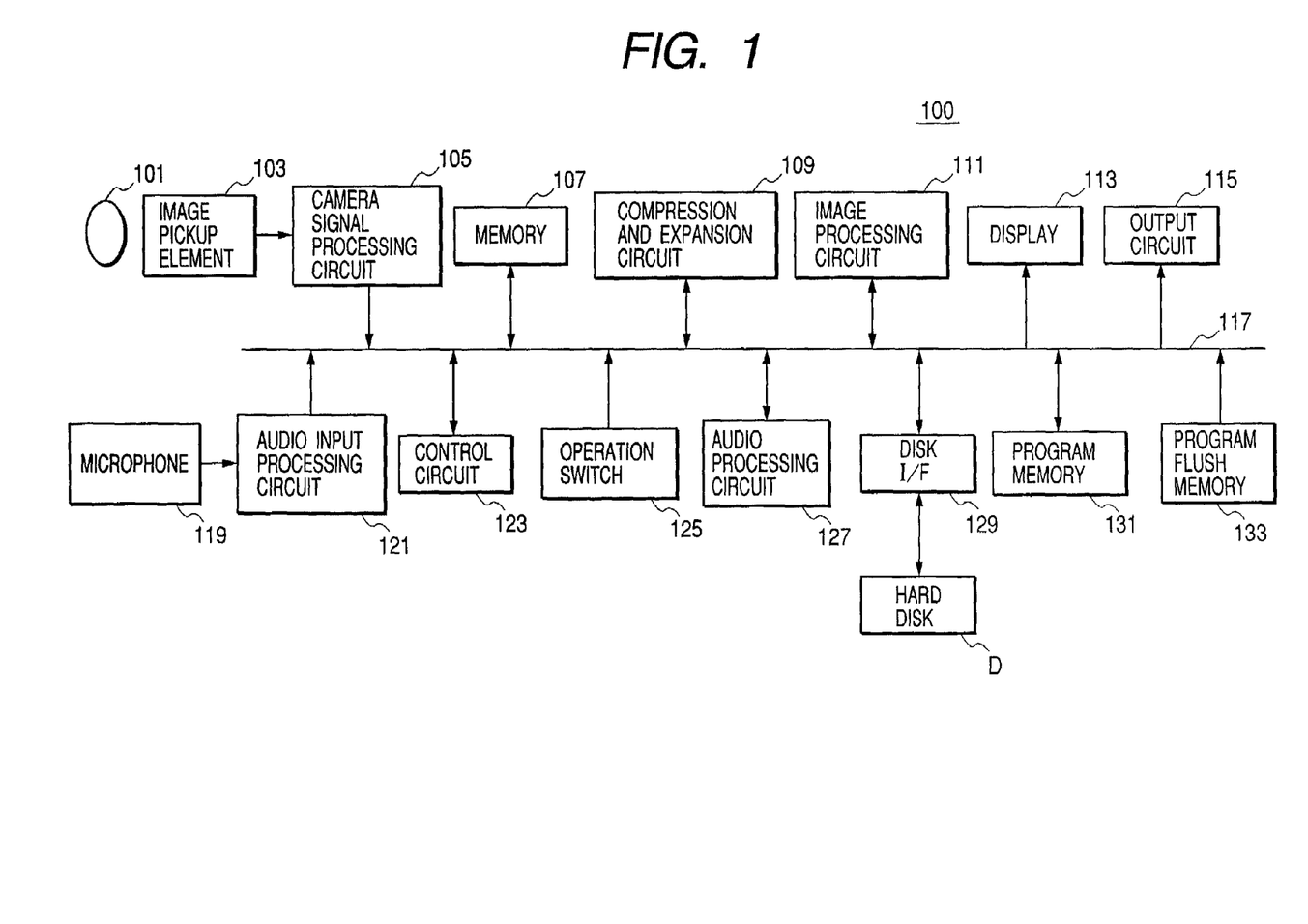
FIG. 1 is a block diagram showing a configuration of an image pickup apparatus according to the present invention.

FIG. 1 is a block diagram showing a configuration of an image pickup apparatus 100 of the present invention.

In the present embodiment, a series of moving image scenes obtained from recording operation start designation provided by operating a photographing start button, to recording stop designation provided by operating a photographing button again is called one take.

In FIG. 1, a compressed program is stored in a program flush memory 133. When the image pickup apparatus 100 is actuated after power is supplied, the program is thawed and developed on the program memory 131. Then, a CPU in a control circuit 123 operates according to the program stored in the program memory 131. Accordingly, various control operations described below are performed.

First, description is made of a control operation when a digital moving image camera is set on a recording mode.

After setting of the recording mode by an operation switch 125, a light from an object is passed through an optical system 101 to form an image on an image pickup element 103. The image pickup element 103 generates an image signal corresponding to the formed image of the object. The image signal generated by the image pickup element 103 is read out at a predetermined period by a camera signal processing circuit 105, processed to be a standard image signal, and then outputted as a digital image signal. The digital image signal thus obtained is temporarily stored through a bus 117 in a memory 107, simultaneously sent to a display 113, and then a moving image currently being photographed is displayed on a display 113.

The image signal stored in the memory 107 is coded in a format compliant with an MPEG 2 by a compression and expansion circuit 109. and written in the memory 107 again. The memory 107 can store amoving image signal of a predetemiined period T1, which is compressed and coded in the above-described manner. In the memory 107, the compressed and coded moving image signal is stored by cyclically designating a write-in address. As a result, a newest compressed and coded moving image signal of the predetermined period T1 is always stored in a memory 107.

On the other hand, a microphone 119 generates an audio signal indicating an ambient sound, and outputs it to an audio input processing circuit 121. The audio input processing circuit 121 performs predetermined processing on the audio signal from the microphone 119, converts it into a digital signal, and then writes it through a bus 117 in the memory 107.

The audio signal written in the memory 107 is, as in the case of the moving image signal, read from the memory 107, coded in a format compliant with the MPEG 2 by the compression and expansion circuit 109, and then written in the memory 107 again. In the memory 107, the coded audio signal is stored by cyclically designating a write-in address. As a result, a newest audio signal of a predetermined period T1 is always stored in the memory 107.

The moving image data and the audio data stored in the memory 107 are not read out until a photographing start is designated, and only write-in operations are sequentially carried out in the memory 107.

When a user operates a photographing button (not shown) included in the operation switch 125 to designate a photographing start, the control circuit 123 controls the memory 107 to start reading-out from oldest data stored in the memory 107 at this time, i.e., moving image data and audio data before now by the predetermined period T1, and sequentially output the data to a disk I/F 129. The disk I/F 129 records a coded data train obtained by multiplexing the moving image data and the andlo data on a hard disk D. The hard disk D is housed in a cartridge, and inserted into/ejected from the image pickup apparatus 100 through a not-shown slot.

Then, the photographing button included in the operation switch 125 is operated again. When a photographing stop is designated, the control circuit 123 controls the memory 107 and the disk I/F 129 so as not to immediately stop the reading-out of the data from the memory 107 and the recording of the data on the disk D, but to continue the reading-out of the moving image signal and the audio signal from the memory 107 and the recording operation on the disk D further for the predetermined period T1 after the photographing stop designation, and then stop the recording of the data on the disk D.

In addition, the control circuit 123 stores in the internal memory a time of each of the photographing start designation and the photographing stop designation provided by the photographing button included in the operation switch 125, and generates play list data based on such time information as described later.

Figure 2:
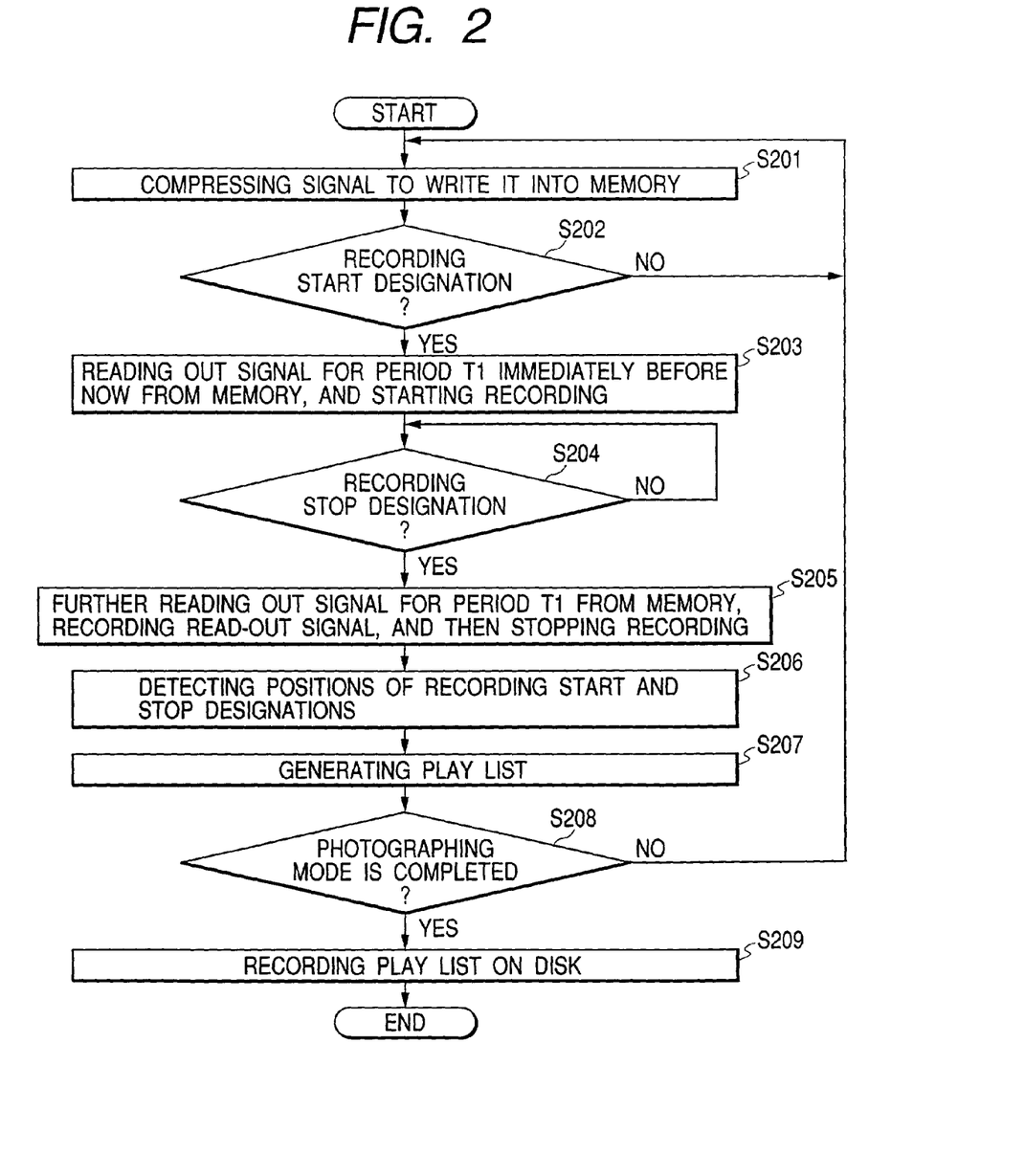
FIG. 2 is a flowchart showing a process performed by a control circuit during recording.

Next, the foregoing process is described by using a flowchart of FIG. 2. FIG. 2 is a flowchart showing a process performed by the control circuit 123 when a moving image signal and an audio signal of one take are recorded. In the description hereinafter, among data of one take, a moving image signal of T1 stored in the memory 107 at the time of the photographing start designation is called a preceding moving image signal; a moving image written in the memory 107 from the time of the photographing start designation by the user to the time of the photographing stop designation a main moving image; and a moving image signal of T1 read-out from the memory 107 and recorded after the photographing stop designation a succeeding moving image signal.

A flow is started when the recording mode is set by the operation switch 125.

When the setting of the recording mode, the moving image signal and the audio signal are compressed as described above, and repeatedly written in the memory 107 (step S201). In this case, a signal from the memory 107 is not read out, and a signal of a predetermined period T1 is always held in the memory 107.

In this state, the process waits for recording start designation (step S202) and, upon receiving the recording start designation, the process proceeds to step S203. In step S203, reading-out is started from the moving image signal and the audio signal before the predetermined period T1 held in the memory 107, and recording thereof on the hard disk D is started. Then, when the photographing button included in the operation switch 125 is operated again, presence of recording stop designation is detected. If no such designation is present, the sequential reading-out of the moving image signal and the audio signal from the memory 107 is continued, and recorded on the disk D (step S204).

On the other hand, if recording stop designation is present, until the predetermined period T1 is passed from the time of the recording stop designation, the writing-in and the reading-out of the compressed moving image and audio signals in the memory 107 are continued, and the recording on the disk D is also continued. Then, after the passage of the predetermined period T1, the reading-out of the signal from the memory 107, and the recording operation on the disk D are stopped (step S205).

Then, a time of recording start designation and a time of recording stop designation for the subject take are detected (step S206). Based on such time information, play list data is generated, and stored in the internal memory (step S207).

The play list is data indicating a procedure of reproducing data stored on the disk D. In this case, a reproducing list is generated for controlling a reproducing process so as to reproduce the signal written in the memory 107 during time from the photographing start designation to the photographing stop designation, i.e., only the main moving image (audio) signal, and inhibit reproducing of the signals of the T1 periods immediately before and after that time, i.e., the preceding and succeeding moving image (audio) signals, in the take obtained.

After the generation of the play list data, detection is made so as to detect whether or not a mode is changed to a mode other than a photographing mode by the operation switch 125. If no mode switching is made, the process returns to step S208, where the process waits for photographing of a next take (step S208).

If switching from the photographing mode is designated, the control circuit 123 reads out the play list data stored in the internal memory, and sends it to the disk I/F 129. The disk I/F 129 records this play list data as one file on the hard disk D, and finishes the process (step S209). In step S206, the time of the recording start designation and the time of the recording stop designation are detected. The time in this case may be an absolute time indicated by a clock built in the apparatus, alternatively a passage of time indicating a length of a take and starting from a head position of the take, a frame number or the like. In addition, in the present embodiment, a signal of one take including preceding and succeeding moving image signals is recorded as one file on the disk D.

Figure 3:
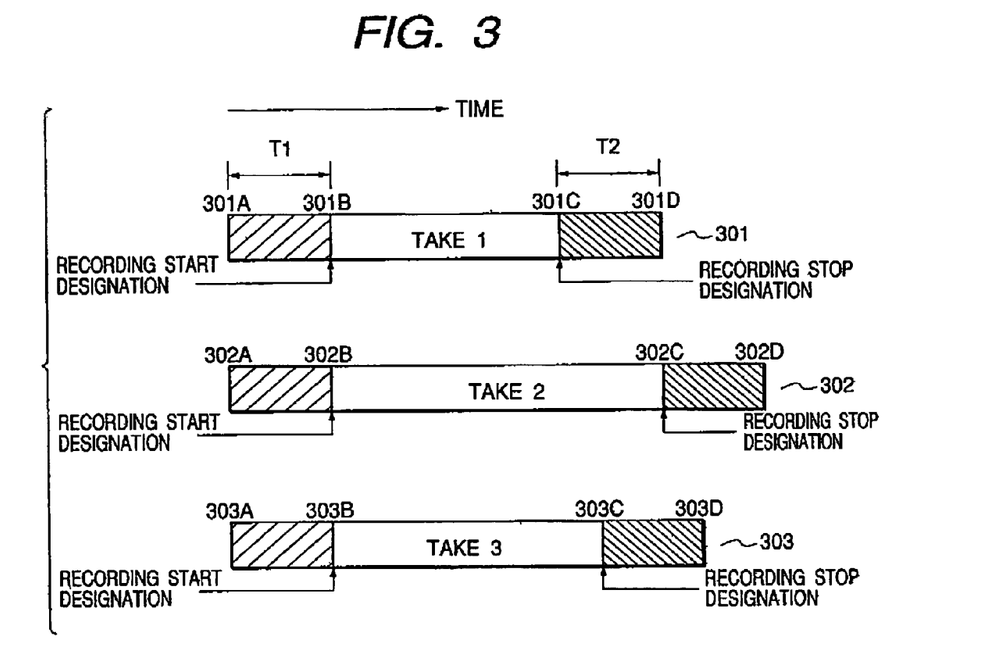
FIG. 3 is a view showing timings for a plurality of takes recorded on a disk.

FIG. 3 shows recording timings for three takes recorded on the disk D by the process shown in FIG. 2.

For a signal 301 of a take 1, a recording start operation is executed by a timing 301B, and a recording stop operation is executed by a timing 301C. The signal 301 from a timing 301A preceding the timing 301B by a period of T1 to a timing 301D later than a timing 301C by a period of T2 is recorded as a signal of the take 1 on the hard disk D. Signals 302 and 303 indicating takes 2 and 3 are also recorded similarly to the signal 301.

Thus, the three takes are recorded on the disk D and, according to the present embodiment, the play list is generated so as to reproduce only the main moving image signal of each take.

Figure 4:
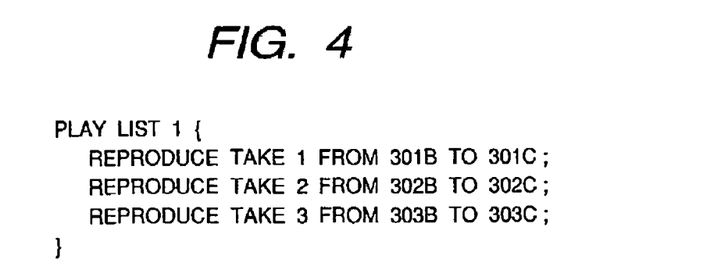
FIG. 4 is a view showing an example of a play list for controlling reproducing operations of the takes of FIG. 3.

FIG. 4 shows a play list 1 recorded on the hard disk 109. The play list of FIG. 4 indicates a reproducing timing (equivalent to a position on the hard disk 109) when each recorded take is reproduced: first, the take 1 is reproduced for a period from the timing 301B to the timing 301C; then, the take 2 is reproduced for a period from a timing 302B to a timing 302C; and lastly the take 3 is reproduced for a period from a timing 303B to a timing 303C, and then the process is completed.

As specific description means of the play list, for example, a descriptive language such as Synchronized Multimedia Integration language (SMIL) can be used.

The control circuit 125 generates such a play list for each recording of a new take on the disk D.

If there are several moving images or audio signals already recorded on the disk D, the control circuit 125 reproduces the play list file from the disk D, which has been recorded on the disk D to control a reproducing operation of the take already recorded, and holds it in the internal memory. Then, a content of this play list is rewritten at every time of completion of recording of each new take.

Next, an operation in a reproducing mode is described. First, a case of executing no scene changing effect processing is described.

When the reproducing mode is set by the operation switch 125, the control circuit 123 controls the disk I/F 129 to reproduce the play list file from the disk D, and stores it in the internal memory.

In this state, when the user operates the operation switch 125 to designate normal reproducing, the control circuit 123 analyzes the content of the play list and controls a reproducing operation according to the content of the play list.

For example, since "REPRODUCE TAKE 1 FROM TIMING 301B TO TIMING 301C" is described in the play list of FIG. 4, a signal of the take 1 is detected from the disk D. Then, the signal of the take 1 is reproduced from the timing 301B by the disk I/F 129. The reproduced signal is outputted to the compression and expansion circuit 109 and decoded by the compression and expansion circuit 109. The decoded moving image signal is sent and displayed on the display 113. The decoded moving image and audio signals are sent to an output circuit 115 and converted into a form suited to an equipment such as an external monitor, and then outputted. Then, the control circuit 123 stops the reproducing of the disk D when the signal of the take 1 read out from the disk D reaches the timing 301C.

In the play list 1 of FIG. 4, since "REPRODUCE TAKE 2 FROM TIMING 302B TO TIMING 302C" is next described, a signal of the take 2 is reproduced from the timing 302B and decoded by the compression and expansion circuit 109 similarly to the above, and the decoded moving image signal of the take 2 is displayed on the display 113. Then, the reproducing of the take 2 is stopped when the signal of the take 2 read out from the disk D reaches the timing 302C. In the play list 1, since "REPRODUCE TAKE 3 FROM TIMING 303B TO TIMING 303C" is next described, processing similar to the above is executed for the take 3.

Since it is described in the play list 1 that the process is completed at the reproducing of the take 3, the reproducing according to the play list 1 is finished when the timing 303C is reached.

In the foregoing operation, interpretation of the play list is first carried out, and then each take is reproduced. However, the interpretation of the play list and the reproducing operation can be carried out in parallel.

Next, description is made of an operation when not normal reproducing but reproducing by executing scene changing effect processing is carried out.

In this case, the user operates the operation switch 125 to designate not normal reproducing but execution of scene changing effect processing between takes, and then designates reproducing after selecting a kind of an effect. Then, the control circuit 123 executes not the foregoing normal reproducing based on the play list but effect reproducing described below.

Figure 5:
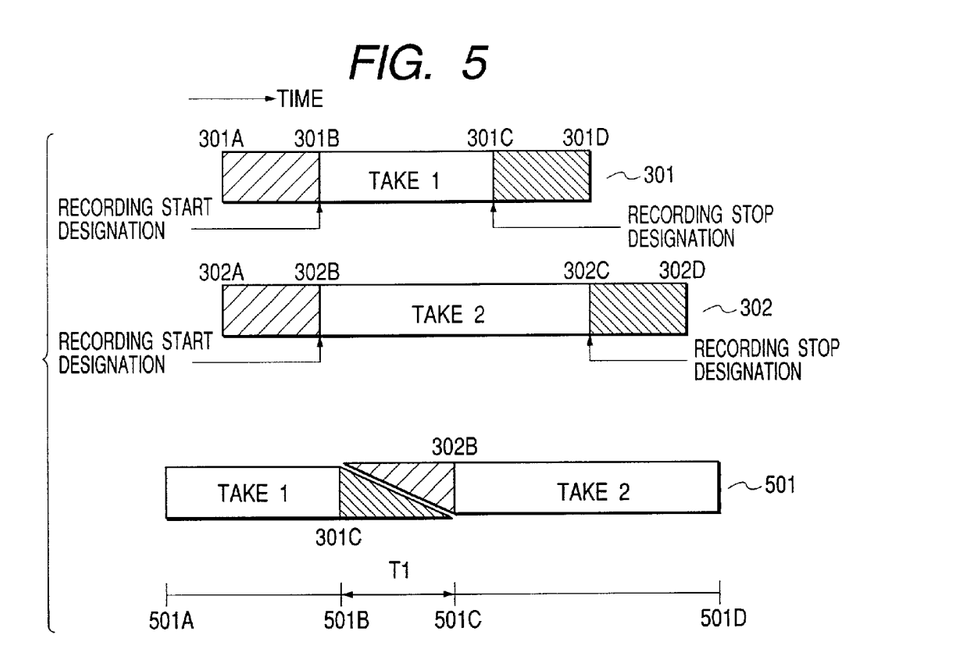
FIG. 5 is a view showing a state of a reproducing timing for scene changing effect processing.

FIG. 5 shows a state of a reproducing operation when scene effect processing is executed during reproducing.

In FIG. 5, when the takes 1 and 2 are continuously reproduced, cross fade processing is executed between the takes 1 and 2.

In this case, the control circuit 123 first reproduces a signal of the take 1 from the timing 301B to the timing 301C as a signal of a period from a timing 501A to a timing 501B of a reproducing signal 501 based on the play list 1 of FIG. 4. Then, a signal (succeeding signal) of a predetermined period T1 from the timing 301C to the timing 301D of the take 1 is reproduced from the disk D, a signal (preceding signal) of a predetermined period T1 from the timing 302A to the timing 302B of the take 2 is reproduced, and these signals are then decoded by the compression and expansion circuit 109.

Subsequently, the succeeding and preceding moving image signals of the takes 1 and 2 decoded by the compression and expansion circuit 109 are outputted to an image processing circuit 111. The image processing circuit 111 gradually lowers a level of the succeeding moving image signal of the take 1 within the predetermined period T1 to generate a fade-out image signal, gradually increases a level of the preceding moving image signal of the take 2 from 0 within the predetermined period T1 to generate a fade-in image signal, and then generates an image signal by synthesizing these fade-out and fade-in image signals of the takes 1 and 2. Then, this synthesized image signal is outputted to the display 113 and the output circuit 115 as a signal of the cross fade timing from 501B to 501C of the reproducing signal 501 of FIG. 5.

On the other hand, the succeeding and preceding audio signals of the takes 1 and 2 decoded by the compression and expansion circuit 109 are both outputted to an audio processing circuit 127. The audio processing circuit 111 gradually lowers a level of the succeeding audio signal of the take 1 within the predetermined period T1 to generate a fade-out audio signal, gradually increases a level of the preceding audio signal of the take 2 from 0 within the predetermined period T1 to generate a fade-in audio signal, and generates an audio signal by synthesizing these fade-out and fade-in audio signals of the takes 1 and 2. Then, this synthesized audio signal is outputted to the output circuit 115 as a signal of the cross fade timing from 501B to 501C of the reproducing signal 501 of FIG. 5.

Subsequently, as a signal from the timing 501C to a timing 501D of the reproducing signal 501, a signal of the period from the timing 302B to the timing 302C of the take 2 is reproduced.

Thus, according to the present embodiment, when the effect processing is executed during reproducing, the effect processing is carried out not for the main moving image signal recorded during a time period from recording start designation to recording stop designation of the user but for the preceding moving image and the audio signal, and the succeeding moving image and the audio signal, which are signals of the periods before and after that time period. Therefore, the signals of the periods from the recording start designation (301B and 302B) to the recording stop designation (301C and 302C) of the takes 1 and 2 are never subjected to any fade-in or fade-out processing.

As a result, the moving image recorded during the time period from the recording start designation to the recording stop designation of the user is prevented from becoming indistinct, and thus a good reproducing video is provided.

The cross fade processing was described as a representative example of the scene changing effect. However, any other scene changing effect processing, e.g., effects including various forms of wiping, spinning, swinging, and paging, can be performed.

Moreover, the periods of the preceding signal, the succeeding signal, and the effect processing were all set similarly to T1. However, lengths different from one another can be independently set.

Next, description is made of displaying of an operation state on a display 106 during photographing and recording.

Figure 6:
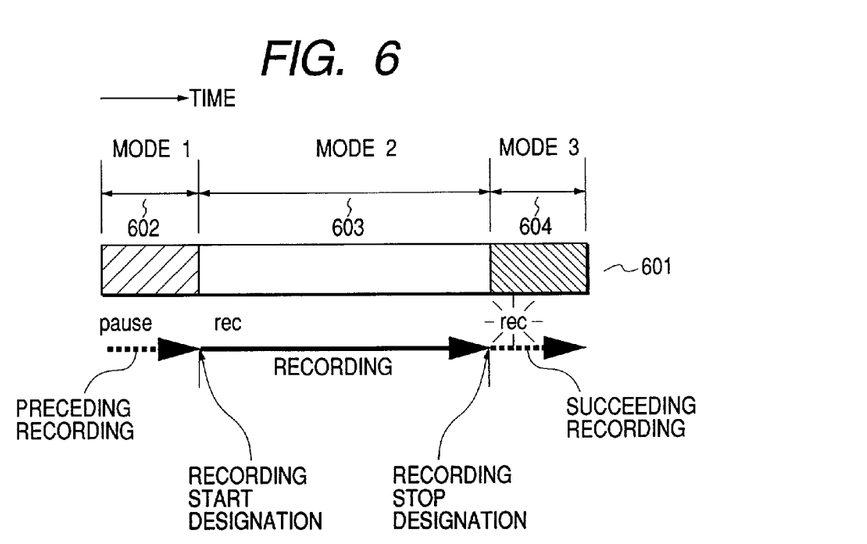
FIG. 6 is a view showing various photographing recording states along a passage of time, which are displayed when one take is photographed and recorded.

FIG. 6 shows various photographing and recording states displayed on the display 113 along a passage of time, when one take is photographed and recorded.

In FIG. 6, during a recording period of a signal 601 of one take, a recording standby state 602 before recording start designation is set as a mode 1; a recording state 603 from the recording start designation to recording stop designation as a mode 2; and a succeeding recording state 604 after the recording stop designation as a mode 3. The control circuit 123 displays "pause" on the display 113, which indicates a recording standby state on the mode 1. Then, on the mode 2, since a state is set where a signal is actually recorded on the disk D, the control circuit 123 displays "rec" on the display 113, which indicates recording.

Then, on the mode 3, since a succeeding signal of a period T1 is actually recorded although a recording stop is designated, "rec" is displayed in a flashing manner indicating such the recording. That is, on the mode 3, the succeeding signal is recorded even after the recording stop designation. In this case, however, "rec" is displayed in the flashing manner to indicate to the user that the image pickup apparatus 100 should be kept directed to the object.

Then, after the recording of the succeeding signal of the predetermined period T1, the image pickup apparatus 100 changes a mode to the mode 1 again to place the process on standby for recording.

Figure 7A:
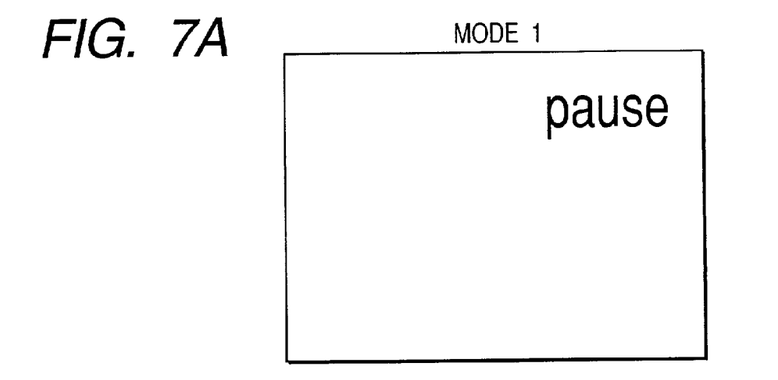
FIGS. 7A, 7B and 7C are views, each showing a display example on a display.
Figure 7B:
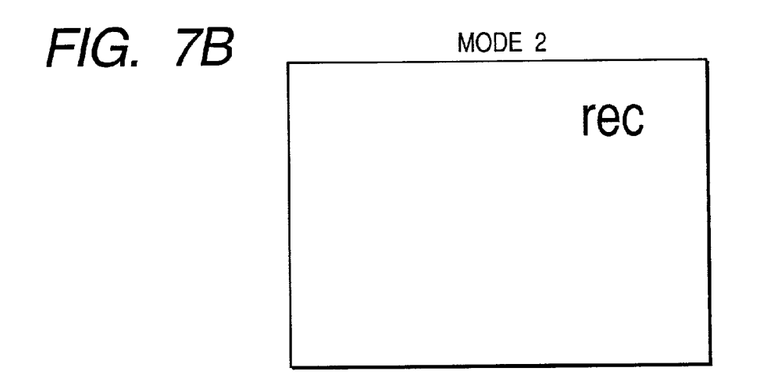
Figure 7C:
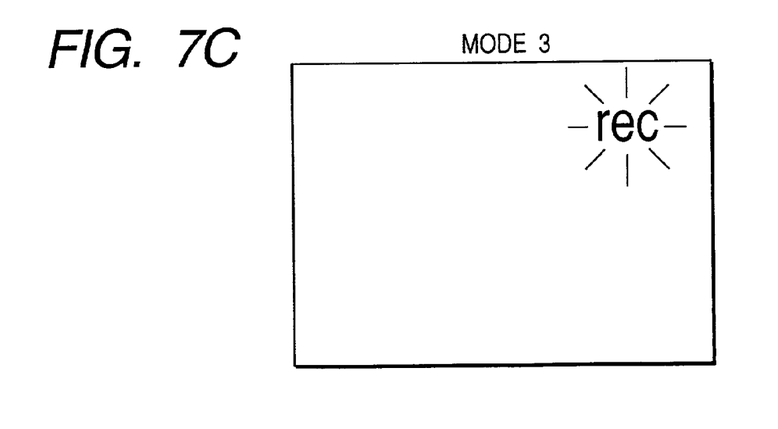

FIGS. 7A, 7B and 7C show states of information displayed on the display 113 on the foregoing three modes: FIG. 7A showing the mode 1, i.e., a display example in a recording standby state; FIG. 7B a display example in a time period from recording start designation to recording stop designation; and FIG. 7C a display example for a predetermined period T1 from after the recording stop designation to completion of recording of a succeeding signal.

These displays are "pause", "rec" and "rec flashing" in the above example. Instead, however, these states may be displayed by icons.

In addition, in the present embodiment, the case of processing executed by user's designating the effect in the reproducing mode is described. However, the user can designate an effect beforehand during photographing.

Processing in such the case is basically similar to the flow of FIG. 2, but a content of the play list generated in step S207 is different.

Figure 10:
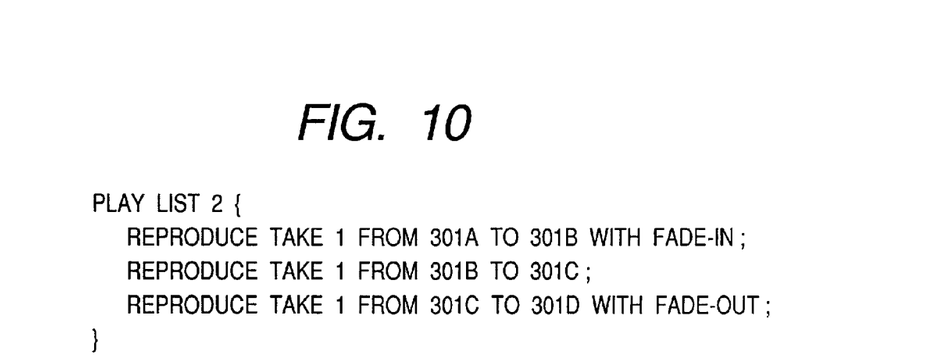
FIG. 10 is a view showing another example of a play list.

That is, in the recording standby state before a start of photographing, if the user designates fade recording by the operation switch 125, the control circuit 123 generates a play list similar to, e.g., that shown in FIG. 10, in step S207.

FIG. 10 shows an example of a play list generated when the signal of the take 1 shown in FIG. 3 is recorded on the disk D while fade recording is set. Other than this, by changing the content of the play list according to a kind of an effect, a similar advantage cane be provided.

The compression and expansion circuit 109 of FIG. 1 may be adapted to execute a coding method for independently compressing and expanding each frame, e.g., a motion JPEG, other than the MPEG 2.

In the embodiment, the moving image signal and the audio signal are recorded on the hard disk D. Other than this, it is possible to use, for example, a disk medium such as an optical disk or a magneto-optical disk, or a solid semiconductor memory such as a FLASH memory, an SRAM or a DRAM.

In addition, the present invention can be achieved by supplying to a system or a device a storage medium storing a program code of software for realizing the function of the embodiment, and causing a computer (alternatively CPU or MPU) of the system or the device to read out and execute the program stored in the storage medium.

In this case, the program code read out from the storage medium itself realizes each function of the embodiment, and the storage medium constitutes the present invention.

As the storage medium for supplying the program code, for example, a floppy disk, a hard disk, an optical disk, a magneto-optical disk, a CD-ROM, a CD-R, a magnetic tape, a nonvolatile memory card, a ROM or the like can be used.

By executing the program code read out by the computer, the function of the foregoing embodiment is realized. Also, based on instructions of the program code, an OS or the like operating on the computer executes a part or all of actual processing, and the function of the foregoing embodiment is realized by this processing. These cases are within the present invention.

Furthermore, the program code read out from the storage medium is written in the memory provided in a function expansion board inserted into the computer or a function expansion unit connected to the computer, then a CPU or the like provided in the function expansion board or the function expansion unit executes a part or all of actual processing based on the instructions of the program code, and the function of the foregoing embodiment is realized by this processing. This case is also within the present invention.

Many widely different embodiments of the present invention may be constructed without departing from the spirit and scope of the present invention. It should be understood that the present invention is not limited to the specific embodiments described in the specification, except as defined in the appended claims.

What is claimed is:

1. A recording apparatus comprising:
   input means for inputting a moving image signal;
   instruction means for instructing a recording start and a recording stop;
   a recording medium interface adapted to record on a recording medium a preceding moving image signal inputted in a first predetermined period immediately before the recording start instruction, a main moving image signal inputted in a period from the recording start instruction to the recording stop instruction and a succeeding moving image signal inputted in a second predetermined period immediately after the recording stop instruction, the recording medium interface recording the preceding moving image signal, the main moving image signal and the succeeding moving image signal as one moving image stream; and generating means for generating play list data according to the recording operation of the moving image signal by said recording medium interface, the play list data being arranged to control a reproducing process of the moving image stream recorded on the recording medium so as to inhibit reproducing of the preceding moving image signal and the succeeding moving image signal, and reproduce the main moving image signal.

2. An apparatus according to claim 1, wherein said recording medium interface records the play list data generated by said generating means on the recording medium, said recording medium interface reproducing the moving image stream according to the play list data recorded on the recording medium.

3. An apparatus according to claim 2, further comprising: image processing means for executing effect processing on the moving image signal reproduced from the recording medium;

control means for controlling said recording medium interface and said image processing means so as to reproduce the preceding moving image signal or the succeeding moving image signal from the recording medium, and execute effect processing for the preceding or succeeding moving image signal according to effect reproducing designation.

4. A recording apparatus comprising:

input means for inputting a moving image signal;

instruction means for arbitrary instructing a recording start and a recording stop of the moving image signal;

recording means for recording an input moving image signal on a recording medium as a moving image stream including the moving image signal inputted by said input means immediately before the recording start instruction and the moving image signal inputted by said input means immediately after tie recording stop instruction; and generating means for generating list data according to the recording operation of the moving image signal by said recording means, the play list data being arranged to control a reproducing process of one moving image stream so as to inhibit reproducing of moving image signals of a first predetermined period from a head of the moving image stream to the recording start instruction and a second predetermined period from the recording stop instruction to an end of the moving image stream, and reproduce a moving image signal of a period other than the first and second predetermined periods in the moving image stream, said recording means recording the play list generated by said generating means on the recording medium.

5. An apparatus according to claim 4, wherein said generating means decides a period other than the first and second predetermined periods according to recording start designation and recording stop desigmition of the moving image signal.

6. An apparatus according to claim 4, further comprising:

reproducing means for reproducing the moving image signal and the play list data recorded on the recording medium; and control means for controlling the reproducing operation of said reproducing means according to the reproduced play list data normally in response to a normal reproduction designation.

7. An apparatus according to claim 6, wherein said control means controls said reproducing means so as to reproduce the moving image signals of the first and second predetermined periods in the moving image stream according to effect reproducing designation.

8. An apparatus according to claim 7, wherein said control means controls said reproducing means so as to continuously reproduce two moving image streams by using moving image signals of first and second predetermined periods in the two moving image streams according to the effect reproducing designation.

9. A recording apparatus comprising:

input means for inputting a moving image signal;

instruction means for instructing a recording start and a recording stop;

recording means for recording on a recording medium a moving image stream including main moving image data inputted in a period from the recording start instruction to the recording stop instruction; and generating means for generating a play list data according to the recording operation of the moving image data by said recording means, the play list data being arranged to control a reproducing process of the moving image stream recorded on the recording medium so as to reproduce the main moving image signal in the moving image stream, and wherein said generating means updates the play list data, in response to recording of new moving image stream, to control the reproducing process of the moving image stream so as to reproduce successively the main moving image data included in a plurality of moving image streams recorded on the recording medium prior to the new moving image stream and the main moving image data included in the new moving image stream.

10. An apparatus according to claim 9, further comprising:

reproducing means for reproducing the moving image stream and the play list data from the recording medium, said generating means including a memory for storing the play list data reproduced by said reproducing means and updating the play list data stored in the memory.

11. An apparatus according to claim 10, further comprising:

control means for controlling said reproducing means according to the play list data reproduced by said reproducing means so as to reproduce successively the main moving image data included in a plurality of the moving image streams recorded on the recording medium.

* * * * *